US 12,536,834 B2

(12) United States Patent
Bhamidipati

(10) Patent No.: US 12,536,834 B2
(45) Date of Patent: Jan. 27, 2026

(54) LOSS FUNCTION ADJUSTMENT FOR INCREASED CLASSIFICATION MARGIN

(71) Applicant: NEC CORPORATION, Tokyo (JP)

(72) Inventor: Anusha V. S. Bhamidipati, Tokyo (JP)

(73) Assignee: NEC CORPORATION, Tokyo (JP)

( * ) Notice: Subject to any disclaimer, the term of this patent is extended or adjusted under 35 U.S.C. 154(b) by 479 days.

(21) Appl. No.: 17/992,845

(22) Filed: Nov. 22, 2022

(65) Prior Publication Data

US 2024/0169759 A1    May 23, 2024

(51) Int. Cl.
*G06V 40/16* (2022.01)
*G06V 10/762* (2022.01)
*G06V 10/82* (2022.01)

(52) U.S. Cl.
CPC .......... *G06V 40/172* (2022.01); *G06V 10/762* (2022.01); *G06V 10/82* (2022.01)

(58) Field of Classification Search
CPC .... G06V 40/172; G06V 10/762; G06V 10/82; G06V 40/40; G06V 10/764
See application file for complete search history.

(56) References Cited

U.S. PATENT DOCUMENTS

2023/0087526 A1*   3/2023   Huang .................. G06V 20/30
                                                              382/156

FOREIGN PATENT DOCUMENTS

CN          114220145 A  *  3/2022 ........... G06F 18/214

OTHER PUBLICATIONS

Zhang, L., Qiao, T., Xu, M., Zheng, N., & Xie, S. (2022). Unsupervised learning-based framework for deepfake video detection. IEEE Transactions on Multimedia, 25, 4785-4799. (Year: 2022).*
K. P. Sinaga and M.-S. Yang, "Unsupervised K-Means Clustering Algorithm," in IEEE Access, vol. 8, pp. 80716-80727, 2020, doi: 10.1109/ACCESS.2020.2988796. (Year: 2020).*
Deng, J., Guo, J., Liu, T., Gong, M., & Zafeiriou, S. (Aug. 2020). Sub-center arcface: Boosting face recognition by large-scale noisy web faces. In European Conference on Computer Vision (pp. 741-757). Cham: Springer International Publishing. (Year: 2020).*
Jiao, J., Liu, W., Mo, Y., Jiao, J., Deng, Z., & Chen, X. (2021). Dyn-arcface: dynamic additive angular margin loss for deep face recognition. Multimedia Tools and Applications, 80(17), 25741-25756. (Year: 2021).*

* cited by examiner

*Primary Examiner* — Stephen R Koziol
*Assistant Examiner* — Ashley Hytrek
(74) *Attorney, Agent, or Firm* — HAUPTMAN HAM, LLP

(57) ABSTRACT

Loss function adjustment for increased classification margin is performed by applying a neural network to a batch of data samples to obtain a plurality of feature vectors, each data sample in the batch corresponding to a feature vector among the plurality of feature vectors, each data sample in the batch including a label indicating a class among a plurality of classes, clustering first feature vectors among the plurality of feature vectors that correspond to data samples including labels indicating a first class among the plurality of classes to separate the first feature vectors into a plurality of clusters, and adjusting parameters of a loss function to increase a margin between a second class and a cluster among the plurality of clusters that is closest to the second class in a feature distribution space.

19 Claims, 7 Drawing Sheets

LOSS FUNCTION ADJUSTMENT FOR INCREASED CLASSIFICATION MARGIN

BACKGROUND

Deep learning frameworks are effective in classifying categories with a large degree of dissimilarity, such as the MNIST (Modified National Institute of Standards and Technology) handwritten digit database, CIFAR (Canadian Institute For Advanced Research) 10 image dataset, etc. Loss functions are utilized to tune deep learning models for state-of-the-art performance. Common types of loss functions for classification are angular loss functions, such as cross-entropy loss, softmax loss, sigmoid loss, etc., and distribution-based/linear loss functions, such as center loss, Gaussian Mixture loss, etc.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
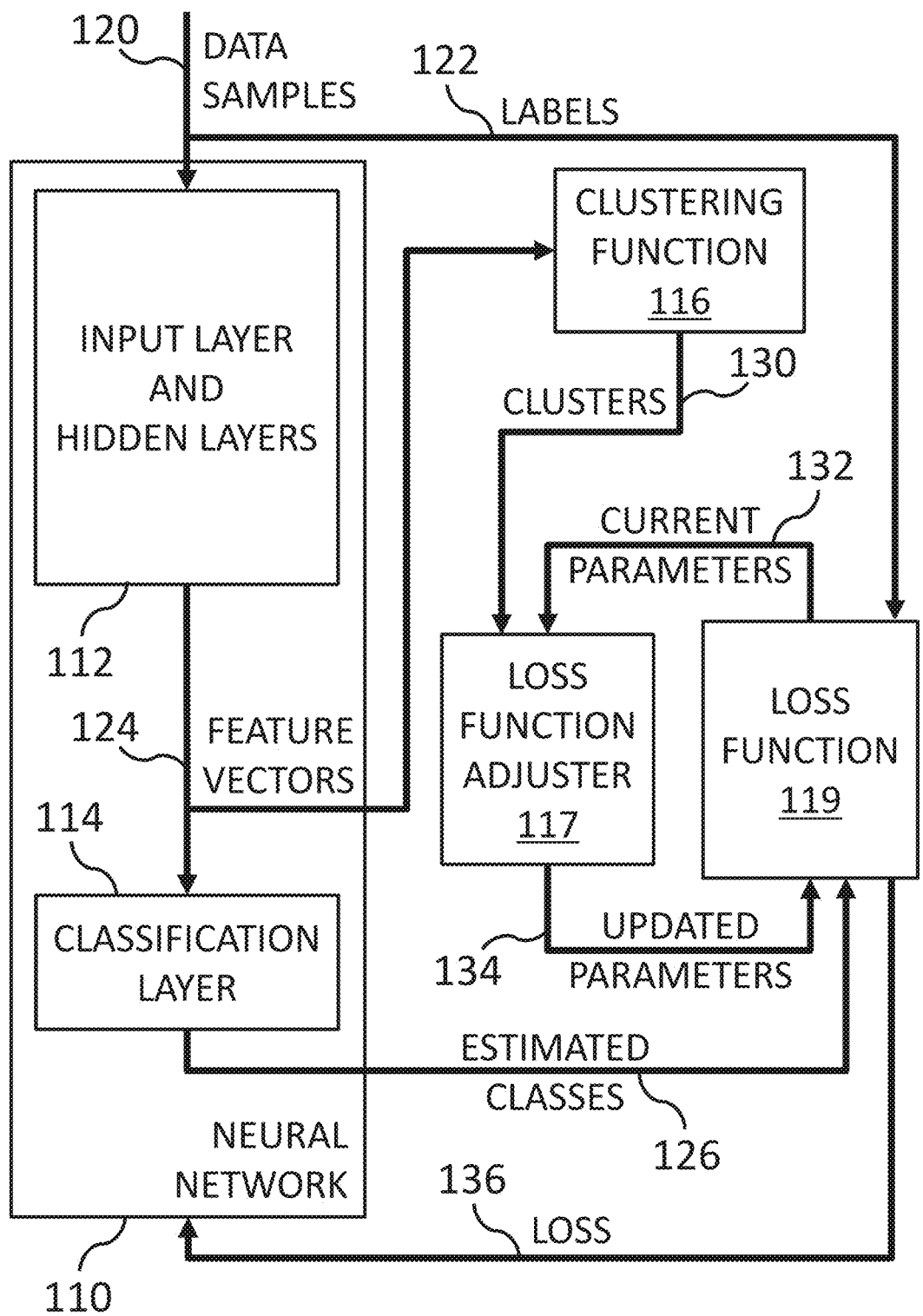
FIG. 1 is a schematic diagram of data flow for loss function adjustment for increased classification margin, according to at least some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Many instances of practically used data have a significant amount of intra-category dissimilarity, which makes it difficult to obtain clear inter-category classification margins. This difficulty also makes generalizing deep learning frameworks difficult to many practical and industrial applications.

The common types of loss functions for classification work very well, but statistically neural networks become more generalizable as the classification margin between the classes increases. To improve performance, loss functions are modified to add further distance/separation to classification margins. Such modified loss functions are referred to as large margin classification loss functions, which include angular margin loss functions, such as large margin softmax loss functions, including CosFace, SphereFace, ArcFace, additive softmax loss, and large-margin softmax loss. Large margin classification loss functions also include large margin distribution loss functions, such as Large-Margin Gaussian Mixture loss.

Modified classification loss functions with large margins help in making the deep neural networks more generalizable and also improve the network performance, but struggle to improve the results of deep neural networks when the data exhibits low inter-class variation and also exhibits high intra-class variation. Such data can be seen practically in the area of fraud detection, presentation attack detection, medical imaging, fine-grained image recognition, hierarchical classification, etc.

In general, classification neural networks, even those with class separation margins, struggle to generalize data sets exhibiting class imbalance, such as hierarchical or layer-wise classes where the inter-class variation is low and also the intra-class variation is high. For example, training neural networks with face presentation attack data with two of the large margin loss functions: large margin cosine loss and large margin Gaussian mixture loss, even if margins are applied, the classification margins do not clearly separate real facial images from fake facial images due to the many types of fake facial images (high intra-class variation).

At least some embodiments described herein are used to obtain or improve classification margins of any classification neural network, such as deep neural networks, even when the data has a significant amount of intra-class variability, making neural networks more robust and generalizable and hence, more practically viable. At least some embodiments are applicable for building robust and generalized presentation attack detection in facial recognition, handling class imbalance, handling hierarchical classification, handling fine-grained image recognition, etc.

At least some embodiments include a method for centroid selection and classification margin application. In at least some embodiments, the centroid for applying the classification margin is selected dynamically through unsupervised clustering. At least some embodiments account for high intra-class variability and obtain clear classification margins with high feature separation, which may create more generalizable and robust neural network models.

In at least some embodiments, one or more classes are clustered, and then a margin is applied to separate the classes based on the nearest cluster. In at least some embodiments, applying a margin to separate the classes based on the nearest cluster enables training of the neural network to distinguish data samples of different classes with greater accuracy, even with classes of high intra-class variation and low inter-class variation. In at least some embodiments, applying a margin to separate the classes based on the nearest cluster enables training of a neural network to distinguish real facial images from fake facial images despite many different types of fake facial images belonging to a hierarchy of types.

FIG. 1 is a schematic diagram of data flow for loss function adjustment for increased classification margin, according to at least some embodiments of the subject disclosure. The diagram includes a neural network 110, a clustering function 116, a loss function adjuster 117, and a loss function 119.

Neural network 110 includes a plurality of layers grouped into an input layer and hidden layers 112 and a classification layer 114. In at least some embodiments, data samples 120 are fed into the input layer of neural network 110, resulting in output of feature vectors 124 just before application of classification layer 114, and output of estimated classes 126 upon input of the feature vectors to classification layer 114. In at least some embodiments, neural network 110 is a classification neural network, such as a deep neural network. In at least some embodiments, data samples 120 are images, such as images of faces for facial recognition, including real facial images, i.e.—images of actual faces of real people, and fake facial images, i.e.—images of articles that have been manufactured to appear as actual faces. In at least some embodiments, feature vectors 124 are feature-rich representations of data samples 120 that are more suitable for classification than data samples 120. In at least some embodiments, feature vectors 124 includes a feature vector corresponding to each data sample among data samples 120. In at least some embodiments, classification layer 114 is configured to estimate which class among a finite number of classes an input feature vector belongs. In at least some embodiments, the number of classes is two, while in other embodiments the number of classes is more than two. In at least some embodiments, the classes include real facial images and fake facial images. In at least some embodiments, estimated classes 126 includes a class corresponding to each feature vector among feature vectors 124.

Clustering function 116 is applicable to feature vectors 124 to produce clusters 130. In at least some embodiments, clustering function 116 is configured to determine a number of clusters, and to which cluster among the number of clusters each feature vector among feature vectors 124 belongs. In at least some embodiments, clusters 130 includes information about each cluster among the number of clusters, the information including the feature vectors that belong to each cluster. In at least some embodiments, clusters 130 includes feature vectors 124. In at least some embodiments, clustering function 116 includes an algorithm to determine a number of clusters that is separate from an algorithm to determine which cluster among the number of clusters each feature vector among feature vectors 124 belongs.

Loss function adjuster 117 is applicable to clusters 130 to update parameters of loss function 119 from current parameters 132 to updated parameters 134. In at least some embodiments, loss function adjuster 117 adjusts the parameters of loss function 119 to apply margins to loss function 119 to separate feature vectors in a feature distribution space. In at least some embodiments, loss function 119 is a function used to compute a loss 136 based on comparison of estimated classes 126, which represent, for each data sample among data samples 120, a class determined by the neural network, with labels 122, which represent the ground truth class of each data sample among data samples 120. In at least some embodiments, loss function 119 is a large margin classification loss function, such as an angular margin loss function, a large margin distribution loss function, etc. In at least some embodiments, loss function 119 has applied margins determined by parameters. In at least some embodiments, loss function adjuster 117 is configured to apply margins to loss function 119 by adjusting the parameters, such as by replacing current parameters 132 with updated parameters 134. In at least some embodiments, loss function adjuster 117 performs the operational flow described hereinafter with respect to FIG. 6.

In at least some embodiments, parameters of neural network 110, such as parameters within input layer and hidden layers 112 and parameters within classification layer 114, are updated based on loss 136 computed after loss function adjuster 117 has replaced current parameters 132 of loss function 119 with updated parameters 134.

Figure 2:
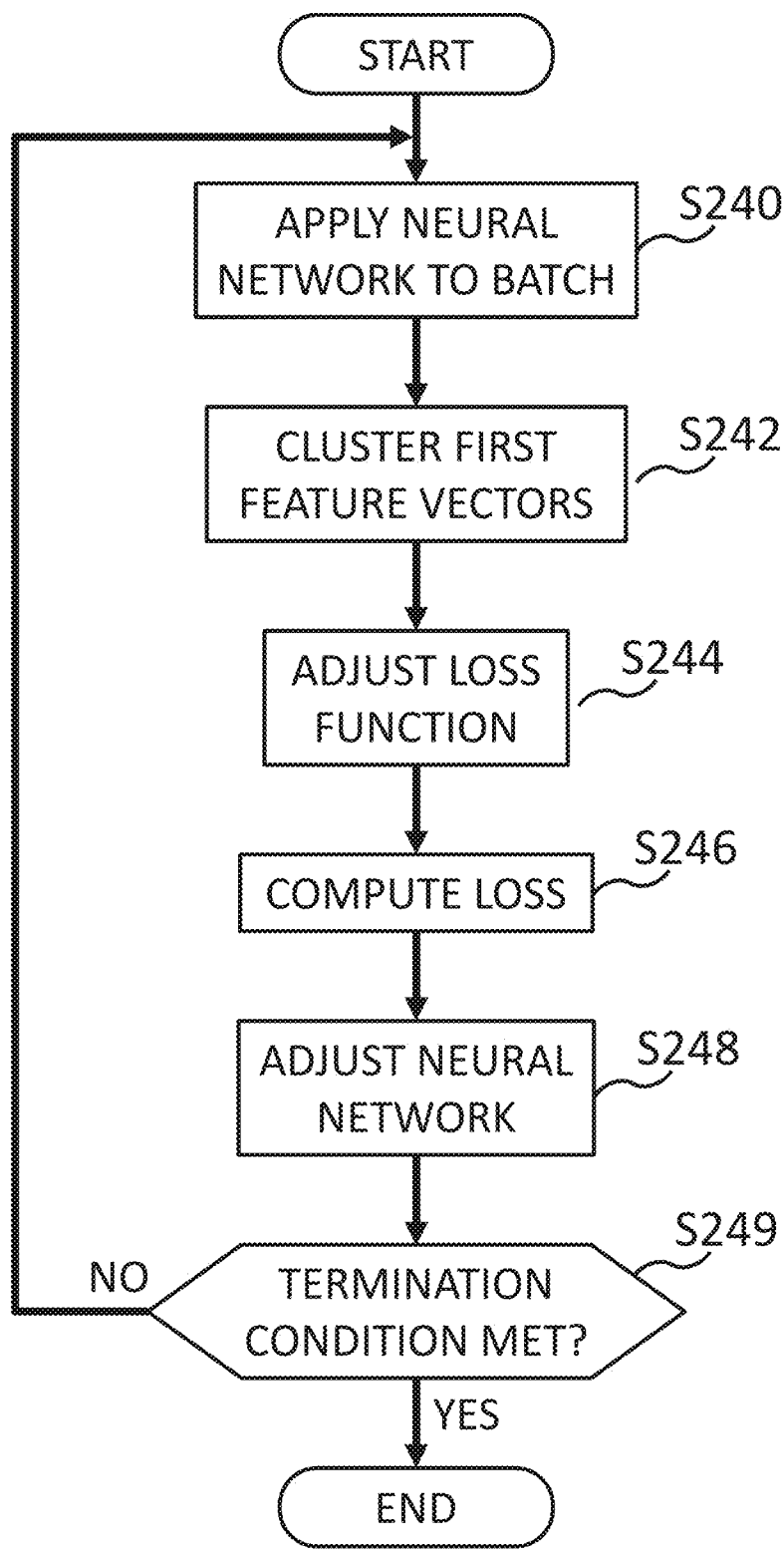
FIG. 2 is an operational flow for loss function adjustment for increased classification margin, according to at least some embodiments of the subject disclosure.

FIG. 2 is an operational flow for loss function adjustment for increased classification margin, according to at least some embodiments of the subject disclosure. The operational flow provides a method of loss function adjustment for increased classification margin. In at least some embodiments, one or more operations of the method are executed by a controller of an apparatus, such as the controller and apparatus shown in FIG. 9, which will be explained hereinafter.

At S240, an applying section applies a neural network to a batch of data samples. In at least some embodiments, the applying section applies a neural network to a batch of data samples to obtain a plurality of feature vectors, each data sample in the batch corresponding to a feature vector among the plurality of feature vectors, each data sample in the batch including a label indicating a class among a plurality of classes. In at least some embodiments, the applying section inputs the batch of data samples one at a time to the input layer of the neural network, causing the neural network to compute, for each data sample, a feature vector and an estimated class.

At S242, a clustering section clusters a first set of feature vectors. In at least some embodiments, the clustering section clusters first feature vectors among the plurality of feature vectors that correspond to data samples including labels indicating a first class among the plurality of classes to separate the first feature vectors into a plurality of clusters. In at least some embodiments, the clustering section uses labels of the data samples to determine the ground truth class of each data sample, and then clusters feature vectors corresponding to data samples having a common ground truth class. In at least some embodiments, the clustering section determines a number of clusters, and to which cluster each feature vector belongs. In at least some embodiments, the clustering section performs the operational flow described hereinafter with respect to FIG. 3.

At S244, an adjusting section adjusts a loss function. In at least some embodiments, the adjusting section adjusts parameters of a loss function to increase a margin between a second class and a cluster among the plurality of clusters that is closest to the second class in a feature distribution space. In at least some embodiments, the adjusting section performs the operational flow described hereinafter with respect to FIG. 6.

At S246, the controller or a section thereof computes loss. In at least some embodiments, the controller computes a loss value by applying the loss function, for each data sample after adjusting the parameters, to an estimated class output from applying the neural network to the data sample and the class indicated by the label. In at least some embodiments, the controller computes a loss based on comparison of estimated classes, which represent, for each data sample in the batch, a class determined by the neural network, with labels representing the ground truth class of each data sample in the batch.

At S248, the controller or a section thereof adjusts the neural network. In at least some embodiments, the controller adjusts parameters of the neural network based on the loss. In at least some embodiments, the controller adjusts weight values of the neural network. In at least some embodiments, the controller calculates gradients of the weights based on the loss value through backpropagation. In at least some embodiments, the controller updates the weight values based on the calculated gradients.

At S249, the controller determines whether a termination condition has been met. In at least some embodiments, as iterations of the operational flow proceed, the controller trains the neural network to estimate the correct class in response to application to each data sample in the batch. In at least some embodiments, the termination condition is met when a predetermined number of batches have been processed, or when a predetermined number of epochs have been performed. In at least some embodiments, the termination condition is met when a loss calculated from the loss function has become smaller than a threshold loss. In at least some embodiments, the termination condition is met when the neural network has converged on a solution. If the termination condition has not yet been met, then the operational flow returns to neural network application at S240. If the termination condition has been met, then the operational flow ends.

In at least some embodiments, as iterations of the operational flow of FIG. 2 proceed, the controller performs a plurality of iterations of the applying the neural network to a plurality of batches of data samples, the clustering the first feature vectors, the adjusting the parameters of the loss function, the computing the loss, and the adjusting the parameters of the neural network to obtain a classification model. In at least some embodiments, the classification model can be used for classification of unknown data samples for which the class is not known. In at least some embodiments, the controller determines to which class among the plurality of classes an unknown data sample belongs by applying the classification model to the unknown data sample. In at least some embodiments, the controller applies the classification model to an unknown facial image to determine whether the unknown facial image is real or fake.

Figure 3:
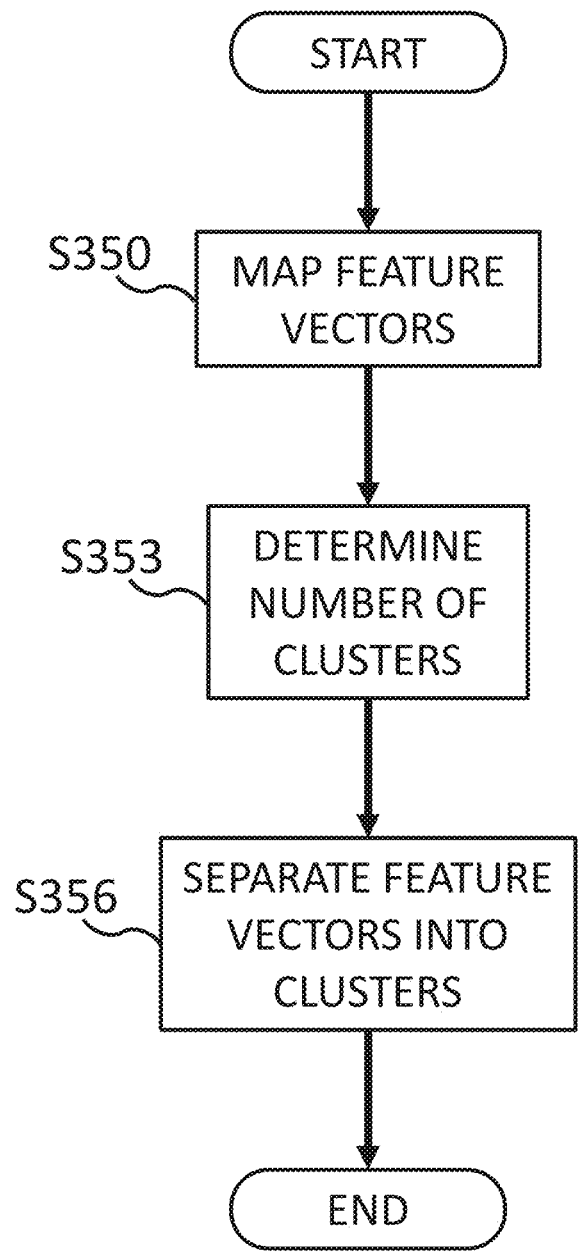
FIG. 3 is an operational flow for feature vector clustering, according to at least some embodiments of the subject disclosure.

FIG. 3 is an operational flow for feature vector clustering, according to at least some embodiments of the subject disclosure. The operational flow provides a method of feature vector clustering. In at least some embodiments, one or more operations of the method are executed by a clustering section of an apparatus, such as the apparatus shown in FIG. 9, which will be explained hereinafter.

At S350, the clustering section or a sub-section thereof maps the feature vectors. In at least some embodiments, the clustering section maps the feature vectors by class of the corresponding data samples. In at least some embodiments, the clustering section maps the feature vectors in a feature distribution space, such as the feature distribution space shown in FIG. 4.

Figure 4:
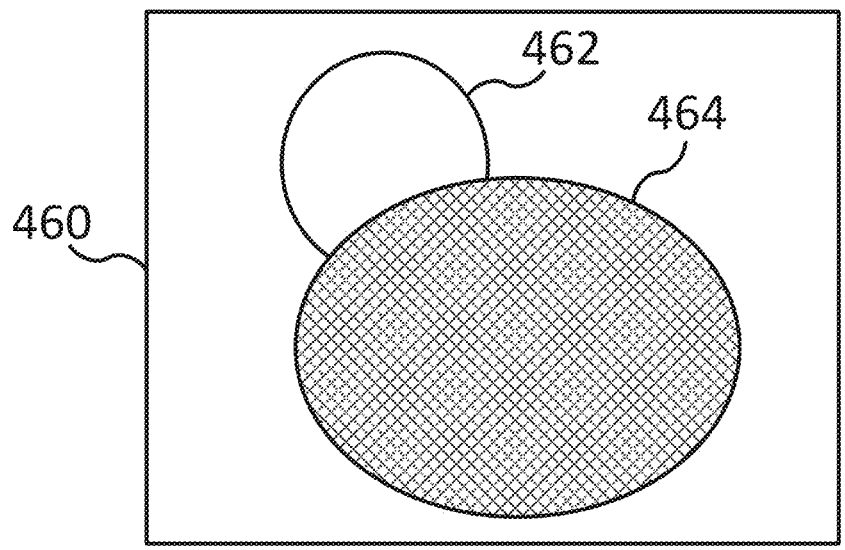
FIG. 4 is a graph of a feature distribution space showing two classes, according to at least some embodiments of the subject disclosure.

FIG. 4 is a graph of a feature distribution space 460 showing two classes, according to at least some embodiments of the subject disclosure. In at least some embodiments, feature distribution space 460 is in a linear domain, such as where there are fewer classes or clusters, or in an angular domain, such as where there are many classes or clusters. The two classes in feature distribution space 460 are second class 462 and first class 464. First class 464 overlaps second class 462 in feature distribution space 460, which suggests that first class 464 and second class 462 have low inter-class variation. First class 464 is significantly larger than second class 462 in feature distribution space 460, which may indicate that first class 464 has high intra-class variation. In at least some embodiments, the data samples are facial images, first class 464 represents fake facial images, and second class 462 represents real facial images.

At S353, the clustering section or a sub-section thereof determines a number of clusters. In at least some embodiments, the clustering section determines a number of clusters into which to separate the first feature vectors based on the first feature vectors. In at least some embodiments, the clustering section determines the number of clusters includes using Bayesian Information Criteria (BIC). In at least some embodiments, the clustering section determines the number of clusters using the following algorithm:

$$C = \mathrm{argmax}(\mathrm{gradient}(\mathrm{BIC})) \qquad \mathrm{EQ.\ 1,}$$

where C is the number of clusters and $$\mathrm{BIC} = -2\log(\hat{L}) + \log(N)d \qquad \mathrm{EQ.\ 2,}$$

where $\hat{L}$ is the maximum likelihood of the neural network, d is the number of parameters or the degrees of freedom, and N is the number of samples.

In at least some embodiments, as iterations of the operational flow of FIG. 2 proceed, and operational flow for feature vector clustering of FIG. 3 is repeated for different batches of data samples, it is not necessary for the clustering section to determine the same number of clusters for each iteration. In at least some embodiments, not all batches will have data samples representing the same clusters, and therefore the cluster number determination operation at S353 is allowed to determine a different number of clusters for different batches of data samples.

At S356, the clustering section or a sub-section thereof separates feature vectors into clusters. In at least some embodiments, the clustering section uses an unsupervised clustering method, such as k-means, Gaussian Mixture Models, Deep clustering methods, etc., to separate the first feature vectors into the plurality of clusters. In at least some embodiments, the clustering section uses an unsupervised clustering based classification loss. In at least some embodiments, the clustering section separates the feature vectors into clusters in the feature distribution space, such as the feature distribution space shown in FIG. 5.

Figure 5:
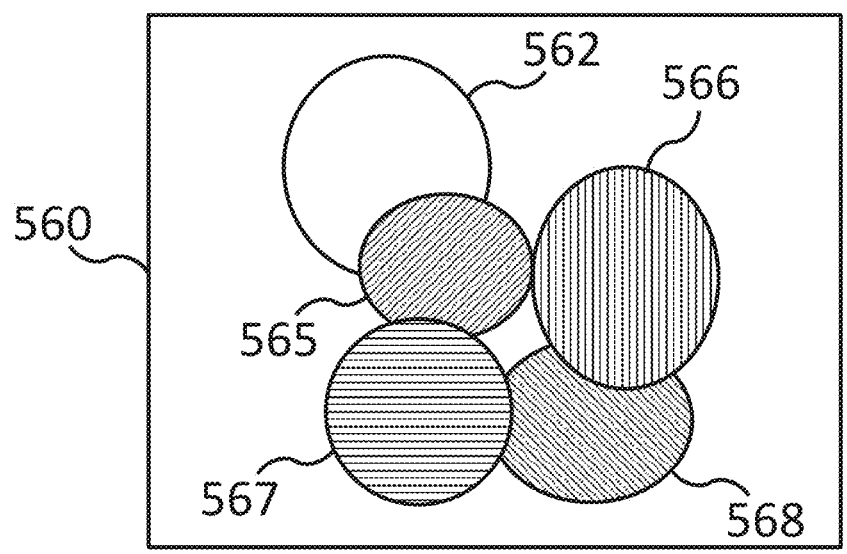
FIG. 5 is a graph of a feature distribution space showing clusters within a class, according to at least some embodiments of the subject disclosure.

FIG. 5 is a graph of a feature distribution space 560 showing clusters within a class, according to at least some embodiments of the subject disclosure. Feature distribution space 560 includes a second class 562 and clusters 565, 566, 567, and 568. In at least some embodiments, clusters 565, 566, 567, and 568 are clusters that resulted from clustering first class 464 of FIG. 4. As a result of clustering, cluster 565 is the only cluster that overlaps second class 562 while clusters 566, 567, and 568 do not. In at least some embodiments, in which the data samples are facial images, second class 562 represents real facial images, and clusters 565, 566, 567, and 568 represent a first class of fake facial images, each of clusters 565, 566, 567, and 568 may represent replay-attack facial images, print facial images, images of silicon masks, images of resin masks, images of realistic masks, or any other image from an attack on a facial recognition system.

In at least some embodiments, more than one class among the classes of the classification neural network are clustered. For example, to train a classification neural network to select among five classes, if three classes exhibit high intra-class variation, then all three classes are subject to clustering.

Figure 6:
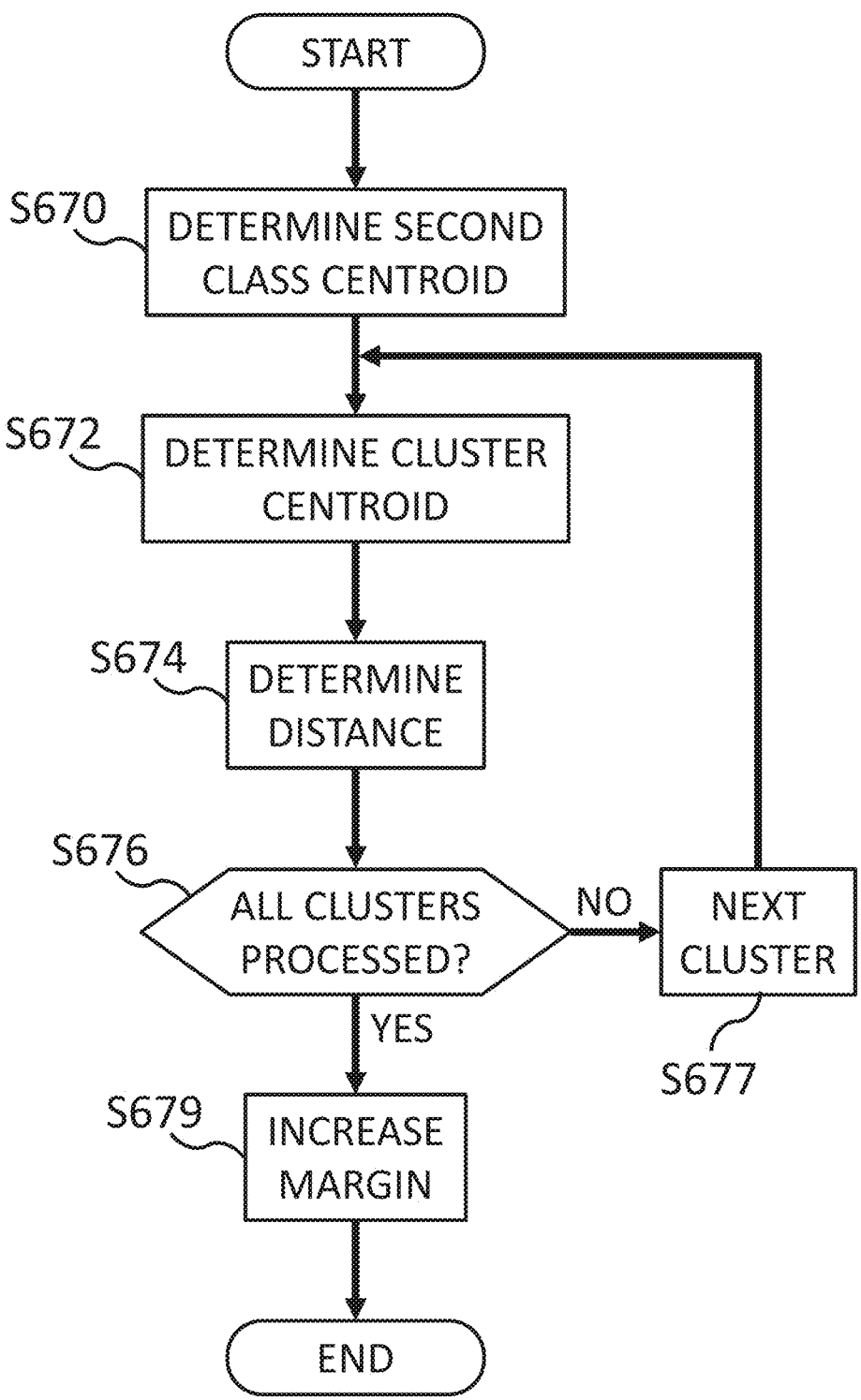
FIG. 6 is an operational flow for loss function adjustment, according to at least some embodiments of the subject disclosure.

FIG. 6 is an operational flow for loss function adjustment, according to at least some embodiments of the subject disclosure. The operational flow provides a method of loss function adjustment. In at least some embodiments, one or more operations of the method are executed by an adjusting section of an apparatus, such as the apparatus shown in FIG. 9, which will be explained hereinafter.

At S670, the adjusting section or a sub-section thereof determines a centroid of a second class. In at least some embodiments, the adjusting section determines a centroid in the feature distribution space of the second class. In at least some embodiments, the centroid is a point within the feature distribution space representing the mean of feature vectors in the second class. In at least some embodiments, for distribution based losses, centroids are selected as a mean of input feature vectors in a class. In at least some embodiments, such as in Gaussian mixture loss, the adjusting section computes the mean as follows:

$$\text{Mean}(\mu_k) = \left(\frac{1}{n}\right) * \sum_1^n X_k, \qquad \text{EQ. 3}$$

where k∈ number of classes, and
$X_k=[x_1, x_2, x_3 \ldots x_n]$ for class k.
In at least some embodiments, centroids are initialized in a static manner.

At S672, the adjusting section or a sub-section thereof determines a centroid of a cluster. In at least some embodiments, as iterations of operation S672 proceed, the adjusting section determines a centroid in the feature distribution space of each cluster among the plurality of clusters. In at least some embodiments, the adjusting section utilizes EQ. 3 to determine the centroid of the cluster.

At S674, the adjusting section or a sub-section thereof determines a distance between the centroid of the cluster and the centroid of the second class. In at least some embodiments, as iterations of operation S674 proceed, the adjusting section determines, for each cluster among the plurality of clusters, a distance between the centroid of the cluster and the centroid of the second class. In at least some embodiments, the adjusting section determines the distances to determine which cluster is closest to the second class.

Figure 7:
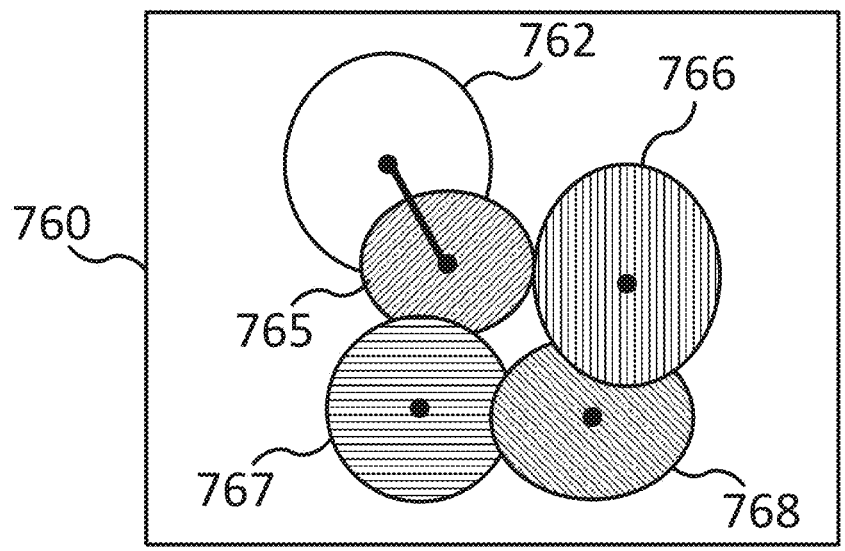
FIG. 7 is a graph of a feature distribution space showing centroids of a class and clusters, according to at least some embodiments of the subject disclosure.

FIG. 7 is a graph of a feature distribution space 760 showing centroids of a second class 762 and clusters 765, 766, 767, and 768, according to at least some embodiments of the subject disclosure. For simplicity, each centroid is shown in the center of the respective class or cluster, but in at least some embodiments classes and clusters do not form symmetrical shapes, and centroids may appear to be off-center. The closest centroid among the centroids of clusters 765, 766, 767, and 768 to the centroid of second class 762 is the centroid of cluster 765.

At S676, the adjusting section determines whether all clusters have been processed. If the adjusting section determines that unprocessed clusters remain, then the operational flow returns to cluster centroid determination at S672 for centroid determination of the next cluster (S677). If the adjusting section determines that all clusters have been processed, then the operational flow ends.

At S679, the adjusting section or a sub-section thereof increases the margin of the loss function. In at least some embodiments, the adjusting section adjusts parameters of the loss function to increase a margin between the second class and the cluster among the plurality of clusters that is closest to the second class in a feature distribution space. In at least some embodiments, the adjusting section applies a margin and minimizes the loss, then repeats the loss minimization until convergence. In at least some embodiments, the adjusting section applies modified standard loss functions such as CosFace, SphereFace, ArcFace, Additive softmax loss, large-margin softmax loss, Large-Margin GM loss, etc. to constrain the feature space and hence introduce greater separation in the classification margin.

Figure 8:
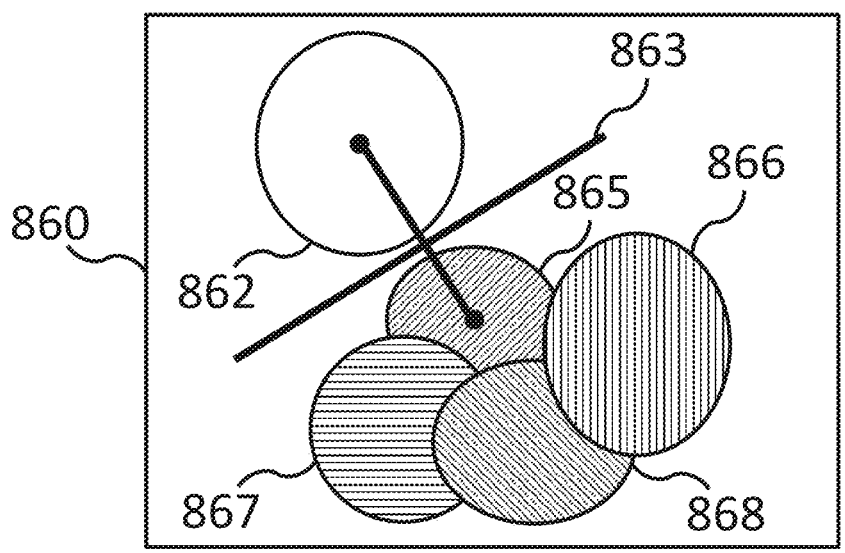
FIG. 8 is a graph of a feature distribution space showing a class and clusters after loss function adjustment, according to at least some embodiments of the subject disclosure.

FIG. 8 is a graph of a feature distribution space 860 showing a second class 862 and clusters 865, 866, 867, and 868 after loss function adjustment, according to at least some embodiments of the subject disclosure. Because the centroid of cluster 865 is closer to the centroid of second class 862 than the centroids of clusters 866, 867, and 868, feature vectors of cluster 865 and second class 862 are used to adjust the parameters of the loss function to adjust a margin 863 between second class 862 and cluster 865. By adjusting margin 863 between second class 862 and cluster 865, distance between second class 862 and clusters 866, 867, and 868 also increases.

In at least some embodiments, more than one class among the classes of the classification neural network are clustered. In at least some embodiments, a margin may be increased between two clustered classes by determining which clusters are closest to each other among all pairs of clusters where one cluster is from one class and the other cluster is from the other class.

Figure 9:
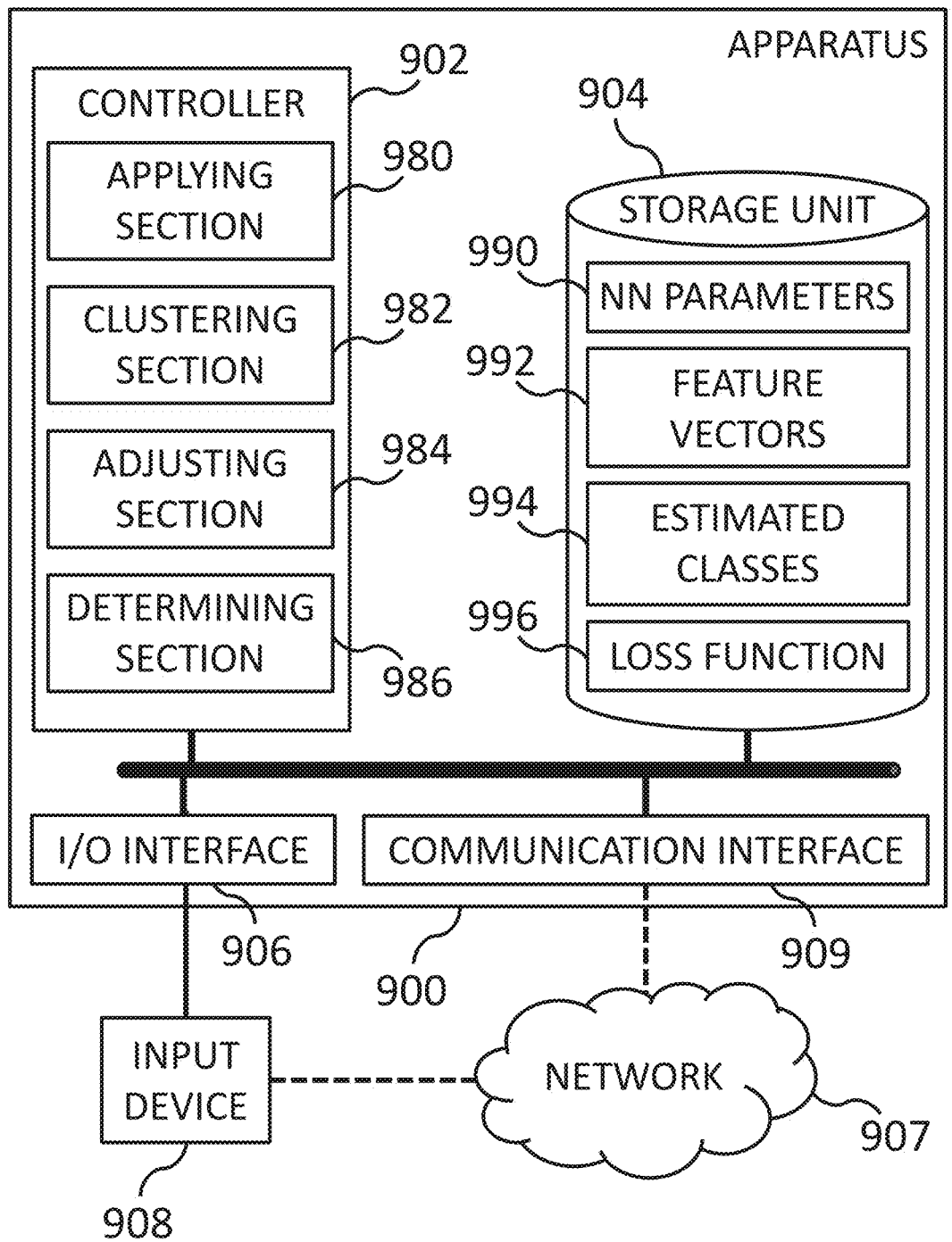
FIG. 9 is a block diagram of a hardware configuration for loss function adjustment for increased classification margin, according to at least some embodiments of the subject disclosure.

FIG. 9 is a block diagram of a hardware configuration for loss function adjustment for increased classification margin, according to at least some embodiments of the subject disclosure.

The exemplary hardware configuration includes apparatus 900, which interacts with input device 908, and communicates with input device 908 through network 907. In at least some embodiments, apparatus 900 is a computer or other computing device that receives input or commands from input device 908. In at least some embodiments, apparatus 900 is integrated with input device 908. In at least some embodiments, apparatus 900 is a computer system that executes computer-readable instructions to perform operations for loss function adjustment for increased classification margin.

Apparatus 900 includes a controller 902, a storage unit 904, an input/output interface 906, and a communication interface 909. In at least some embodiments, controller 902 includes a processor or programmable circuitry executing instructions to cause the processor or programmable circuitry to perform operations according to the instructions. In at least some embodiments, controller 902 includes analog or digital programmable circuitry, or any combination thereof. In at least some embodiments, controller 902 includes physically separated storage or circuitry that interacts through communication. In at least some embodiments, storage unit 904 includes a non-volatile computer-readable medium capable of storing executable and non-executable data for access by controller 902 during execution of the instructions. Communication interface 909 transmits and receives data from network 907. Input/output interface 906 connects to various input and output units, such as input device 908, via a parallel port, a serial port, a keyboard port, a mouse port, a monitor port, and the like to accept commands and present information. In some embodiments, storage unit 904 is external from apparatus 900.

Controller 902 includes applying section 980, clustering section 982, adjusting section 984, and determining section 986. Storage unit 904 includes neural network parameters 990, feature vectors 992, estimated classes 994, and loss function 996.

Applying section 980 is the circuitry or instructions of controller 902 configured to apply neural networks to data samples. In at least some embodiments, applying section 980 is configured to apply a neural network to a batch of data samples to obtain a plurality of feature vectors, each data sample in the batch corresponding to a feature vector among the plurality of feature vectors, each data sample in the batch including a label indicating a class among a plurality of classes. In at least some embodiments, applying section 980 utilizes information in storage unit 904, such as neural network parameters 990, and records information in storage unit 904, such as feature vectors 992 and estimated classes 994. In at least some embodiments, applying section 980 includes sub-sections for performing additional functions, as described in the foregoing flow charts. In at least some embodiments, such sub-sections is referred to by a name associated with a corresponding function.

Clustering section 982 is the circuitry or instructions of controller 902 configured to cluster feature vectors in feature distribution space. In at least some embodiments, clustering section 982 is configured to cluster first feature vectors among the plurality of feature vectors that correspond to data samples including labels indicating a first class among the plurality of classes to separate the first feature vectors into a plurality of clusters. In at least some embodiments, clustering section 982 utilizes information in storage unit 904, such as feature vectors 992. In at least some embodiments, clustering section 982 includes sub-sections for performing additional functions, as described in the foregoing flow charts. In at least some embodiments, such sub-sections is referred to by a name associated with a corresponding function.

Adjusting section 984 is the circuitry or instructions of controller 902 configured to adjust loss function parameters. In at least some embodiments, adjusting section 984 is configured to adjust parameters of a loss function to increase a margin between a second class and a cluster among the plurality of clusters that is closest to the second class in a feature distribution space. In at least some embodiments, adjusting section 984 updates information in storage unit 904, such as loss function 996. In at least some embodiments, adjusting section 984 includes sub-sections for performing additional functions, as described in the foregoing flow charts. In at least some embodiments, such sub-sections is referred to by a name associated with a corresponding function.

Determining section 986 is the circuitry or instructions of controller 902 configured to determine a class of an unknown data sample. In at least some embodiments, determining section 986 is configured to determine to which class among the plurality of classes an unknown data sample belongs by applying the classification model to the unknown data sample. In at least some embodiments, determining section 986 utilizes information from storage unit 904, such as neural network parameters 990. In at least some embodiments, determining section 986 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

According to at least some embodiments of the subject disclosure, loss function adjustment for increased classification margin is performed by applying a neural network to a batch of data samples to obtain a plurality of feature vectors, each data sample in the batch corresponding to a feature vector among the plurality of feature vectors, each data sample in the batch including a label indicating a class among a plurality of classes, clustering first feature vectors among the plurality of feature vectors that correspond to data samples including labels indicating a first class among the plurality of classes to separate the first feature vectors into a plurality of clusters, and adjusting parameters of a loss function to increase a margin between a second class and a cluster among the plurality of clusters that is closest to the second class in a feature distribution space.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium including instructions executable by a processor to cause the processor to perform operations comprising:
    applying a neural network to a batch of data samples to obtain a plurality of feature vectors, each data sample in the batch corresponding to a feature vector among the plurality of feature vectors, each data sample in the batch including a label indicating a class among a plurality of classes;
    clustering first feature vectors among the plurality of feature vectors that correspond to data samples including labels indicating a first class among the plurality of classes to separate the first feature vectors into a plurality of clusters; and
    adjusting parameters of a loss function to increase a margin between a second class and a cluster among the plurality of clusters that is closest to the second class in a feature distribution space,
    wherein the adjusting the parameters includes:
        determining a centroid in the feature distribution space of each cluster among the plurality of clusters and the second class; and
        determining, for each cluster among the plurality of clusters, a distance between the centroid of the cluster and the centroid of the second class.

2. The computer-readable medium of claim 1, wherein the operations further comprise:
    computing a loss value by applying the loss function, for each data sample after adjusting the parameters, to an estimated class output from applying the neural network to the data sample and the class indicated by the label; and
    adjusting parameters of the neural network based on the loss value.

3. The computer-readable medium of claim 2, wherein the operations further comprise:
performing a plurality of iterations of applying the neural network to a plurality of batches of data samples, clustering the first feature vectors, adjusting the parameters of the loss function, computing the loss value, and adjusting the parameters of the neural network to obtain a classification model; and
determining to which class among the plurality of classes an unknown data sample belongs by applying the classification model to the unknown data sample.

4. The computer-readable medium of claim 3, wherein
the data samples are facial images, the first class represents fake facial images, and the second class represents real facial images; and
applying the classification model to an unknown facial image determines whether the unknown facial image is real or fake.

5. The computer-readable medium of claim 1, wherein clustering includes:
determining a number of clusters into which to separate the first feature vectors based on the first feature vectors.

6. The computer-readable medium of claim 5, wherein determining the number of clusters includes using Bayesian Information Criteria.

7. The computer-readable medium of claim 1, wherein clustering includes using one of an unsupervised clustering method or a deep clustering method to separate the first feature vectors into the plurality of clusters.

8. A method comprising:
applying a neural network to a batch of data samples to obtain a plurality of feature vectors, each data sample in the batch corresponding to a feature vector among the plurality of feature vectors, each data sample in the batch including a label indicating a class among a plurality of classes;
clustering first feature vectors among the plurality of feature vectors that correspond to data samples including labels indicating a first class among the plurality of classes to separate the first feature vectors into a plurality of clusters; and
adjusting parameters of a loss function to increase a margin between a second class and a cluster among the plurality of clusters that is closest to the second class in a feature distribution space,
wherein the adjusting the parameters includes:
determining a centroid in the feature distribution space of each cluster among the plurality of clusters and the second class; and
determining, for each cluster among the plurality of clusters, a distance between the centroid of the cluster and the centroid of the second class.

9. The method of claim 8, further comprising:
computing a loss value by applying the loss function, for each data sample after adjusting the parameters, to an estimated class output from applying the neural network to the data sample and the class indicated by the label; and
adjusting parameters of the neural network based on the loss value.

10. The method of claim 9, further comprising:
performing a plurality of iterations of applying the neural network to a plurality of batches of data samples, clustering the first feature vectors, adjusting the parameters of the loss function, computing the loss value, and adjusting the parameters of the neural network to obtain a classification model; and
determining to which class among the plurality of classes an unknown data sample belongs by applying the classification model to the unknown data sample.

11. The method of claim 10, wherein
the data samples are facial images, the first class represents fake facial images, and the second class represents real facial images; and
then applying the classification model to an unknown facial image determines whether the unknown facial image is real or fake.

12. The method of claim 8, wherein clustering includes:
determining a number of clusters into which to separate the first feature vectors based on the first feature vectors.

13. The method of claim 12, wherein determining the number of clusters includes using Bayesian Information Criteria.

14. The method of claim 8, wherein clustering includes using one of an unsupervised clustering method or a deep clustering method to separate the first feature vectors into the plurality of clusters.

15. An apparatus comprising:
a controller including circuitry configured to
apply a neural network to a batch of data samples to obtain a plurality of feature vectors, each data sample in the batch corresponding to a feature vector among the plurality of feature vectors, each data sample in the batch including a label indicating a class among a plurality of classes;
cluster first feature vectors among the plurality of feature vectors that correspond to data samples including labels indicating a first class among the plurality of classes to separate the first feature vectors into a plurality of clusters; and
adjust parameters of a loss function to increase a margin between a second class and a cluster among the plurality of clusters that is closest to the second class in a feature distribution space,
wherein the adjusting the parameters includes:
determining a centroid in the feature distribution space of each cluster among the plurality of clusters and the second class; and
determining, for each cluster among the plurality of clusters, a distance between the centroid of the cluster and the centroid of the second class.

16. The apparatus of claim 15, wherein the circuitry is further configured to:
compute a loss value by applying the loss function, for each data sample after adjusting the parameters, to an estimated class output from applying the neural network to the data sample and the class indicated by the label; and
adjust parameters of the neural network based on the loss value.

17. The apparatus of claim 16, wherein the circuitry is further configured to:
perform a plurality of iterations of applying the neural network to a plurality of batches of data samples, clustering the first feature vectors, adjusting the parameters of the loss function, computing the loss value, and adjusting the parameters of the neural network to obtain a classification model; and determine to which class among the plurality of classes an unknown data sample belongs by applying the classification model to the unknown data sample.

18. The apparatus of claim 17, wherein the data samples are facial images, the first class represents fake facial images, and the second class represents real facial images; and applying the classification model to an unknown facial image determines whether the unknown facial image is real or fake.

19. The computer-readable medium of claim 1, wherein only feature vectors of the closest cluster and feature vectors of the second class are used to adjust the parameters of the loss function.

* * * * *